US012327195B2

(12) United States Patent
Sturlaugson et al.

(10) Patent No.: US 12,327,195 B2
(45) Date of Patent: Jun. 10, 2025

(54) AUTOMATED FEATURE GENERATION FOR SENSOR SUBSET SELECTION

(71) Applicant: THE BOEING COMPANY, Chicago, IL (US)

(72) Inventors: Liessman Sturlaugson, St. Louis, MO (US); James M. Ethington, Saint Charles, MO (US)

(73) Assignee: The Boeing Company, Arlington, VA (US)

( * ) Notice: Subject to any disclaimer, the term of this patent is extended or adjusted under 35 U.S.C. 154(b) by 1110 days.

(21) Appl. No.: 16/209,486

(22) Filed: Dec. 4, 2018

(65) Prior Publication Data
US 2020/0175380 A1 Jun. 4, 2020

(51) Int. Cl.
*G06N 3/12* (2023.01)
*B64D 45/00* (2006.01)
(Continued)

(52) U.S. Cl.
CPC ............ *G06N 3/126* (2013.01); *B64D 45/00* (2013.01); *B64F 5/60* (2017.01); *G06F 11/0739* (2013.01);
(Continued)

(58) Field of Classification Search
CPC .......... G06N 3/126; G06N 20/00; B64F 5/60; B64D 45/00; B64D 2045/0085; G06F 11/0739
See application file for complete search history.

(56) References Cited

U.S. PATENT DOCUMENTS 5,727,128 A * 3/1998 Morrison ................. G06N 3/08
706/14
6,272,479 B1 * 8/2001 Farry ...................... G06F 18/21
706/14
(Continued)

OTHER PUBLICATIONS

Westbury, C., Buchanan, L., Sanderson, M., Rhemtulla, M. and Phillips, L., 2003. Using genetic programming to discover nonlinear variable interactions. Behavior Research Methods, Instruments, & Computers, 35(2), pp. 202-216. (Year: 2003).*
(Continued)

*Primary Examiner* — Omar F Fernandez Rivas
*Assistant Examiner* — Tri T Nguyen
(74) *Attorney, Agent, or Firm* — Harrity & Harrity, LLP

(57) ABSTRACT

A method is provided that includes accessing a multivariate time series of flight data for an aircraft, and iteratively performing runs of genetic programming on groups of the sensors. A population of computer programs is randomly generated from a selected group of the plurality of sensors, and primitive functions selected from a library of primitive functions. The population is iteratively transformed into new generations of the population, and includes sub-rankings of the group of sensors based on a quantitative fitness determined according to selected fitness criterion. A ranking of the group of sensors from the sub-rankings of the group of sensors is produced. An aggregate ranking of the plurality of sensors is produced from the ranking of the group of sensors over a plurality of iterations. And the subset of sensors is selected from the aggregate ranking of the plurality of sensors, and according to selected optimization criterion.

27 Claims, 4 Drawing Sheets

(51) Int. Cl.
*B64F 5/60* (2017.01)
*G06F 11/07* (2006.01)
*G06N 3/126* (2023.01)
*G06N 20/00* (2019.01)

(52) U.S. Cl.
CPC ..... *G06N 20/00* (2019.01); *B64D 2045/0085* (2013.01)

(56) References Cited

U.S. PATENT DOCUMENTS

| | | | | |
|---|---|---|---|---|
| 7,437,335 | B2* | 10/2008 | Baum | G06N 20/00 706/14 |
| 11,170,295 | B1* | 11/2021 | Carmichael | G06N 3/084 |
| 2002/0152037 | A1* | 10/2002 | Sunshine | G01N 29/022 702/23 |
| 2006/0126608 | A1* | 6/2006 | Pereira | G05B 13/042 370/360 |
| 2008/0154811 | A1* | 6/2008 | Grichnik | G06N 3/084 703/2 |
| 2008/0177681 | A1* | 7/2008 | Rosario | G06N 3/126 706/13 |
| 2008/0183444 | A1* | 7/2008 | Grichnik | G05B 23/0254 703/2 |
| 2009/0216393 | A1* | 8/2009 | Schimert | G05B 23/0254 701/14 |
| 2010/0049340 | A1* | 2/2010 | Smits | G05B 13/0265 706/13 |
| 2011/0066579 | A1* | 3/2011 | Ikada | G06N 3/02 706/21 |
| 2012/0005149 | A1* | 1/2012 | Chen | G06N 5/04 706/52 |
| 2015/0302163 | A1* | 10/2015 | Das | G06N 3/02 705/2 |
| 2017/0166328 | A1* | 6/2017 | Ethington | G06Q 10/20 |
| 2018/0077034 | A1* | 3/2018 | Liang | H04J 3/14 |
| 2018/0079532 | A1* | 3/2018 | Carini | G01M 5/0016 |
| 2018/0288080 | A1* | 10/2018 | Keller | H04L 63/1425 |
| 2019/0130769 | A1* | 5/2019 | Rodriguez Bravo | G07C 5/08 |

OTHER PUBLICATIONS

Luke, S., "ECJ Then and Now", George Mason University, GECCO '17 Companion, Jul. 2017, Berlin, Germany, pp. 1-8.

Mierswa, I. et al., "Automatic Feature Extraction for Classifying Audio Data", Jul. 2004, University of Dortmund, Germany, pp. 1-28.

Montavon, G. et al., "Explaining NonLinear Classification Decisions with Deep Taylor Decomposition", Pattern Recognition 65, Jan. 2017, pp. 1-14.

Wikipedia, "Genetic Programming", Oct. 2018, pp. 1-6, retrieved from https://en.wikipedia.org/w/index.pho?title=Genetic_programming &oldid=862701469.

Das, A., "Algorithms for Subset Selection in Linear Regression", Symposium on Theory of Computing, ACM, Victoria, British Columbia, Canada, May 2008, pp. 1-10.

* cited by examiner

AUTOMATED FEATURE GENERATION FOR SENSOR SUBSET SELECTION

TECHNOLOGICAL FIELD

The present disclosure relates generally to machine learning and, in particular, to automated feature generation for sensor subset selection.

BACKGROUND

Machine learning is a process to analyze data in which the dataset is used to determine a machine learning model (also called a rule or a function) that maps input data (also called explanatory variables or predictors) to output data (also called dependent variables or response variables) according to a machine learning algorithm. A broad array of machine learning algorithms are available, with new algorithms the subject of active research. One type of machine learning is supervised learning in which a model is trained with a dataset including known output data for a sufficient number of input data. Once a model is trained, it may be deployed, i.e., applied to new input data to predict the expected output.

Machine learning may be applied to a number of different types of problems such as regression problems and classification problems. In regression problems the output data includes numeric values such as a voltage, a pressure, a number of cycles. In classification problems the output data includes labels, classes, categories (e.g., pass-fail, healthy-faulty, failure type, etc.) and the like. In some particular examples, machine learning may be applied to classify aircraft or aircraft components as healthy or faulty from measurements of properties recorded by an airborne flight recorder, such as a quick access recorder (QAR) of an aircraft that receives its input (measurements) from sensors or avionic systems onboard the aircraft.

In machine learning, features (independent variables) are measureable properties or characteristics of what is being observed, and the selection or generation of relevant features is often an integral part of machine learning. In many systems, a large number of independent variables are observed. Because of time and computing resource requirements (processing and memory requirements in particular), it is often impractical to include all of the independent variables in the model. And there may be some independent variables that are redundant or irrelevant (uncorrelated) to the dependent (response) variable.

In the context of an aircraft with a relatively large set of sensors, it can be particularly important to select the subset of sensors most relevant (correlated) to a dependent variable of interest. This dependent variable could be a number of different variables. For example, the dependent variable could be a flight deck effect or a condition of the aircraft or one or more parts of the aircraft. In this use case, a data analyst may want to quickly and automatically down-select from thousands of sensors to just dozens of sensors that the analyst can focus on to find root cause or build a predictive maintenance model. In another example, the dependent variable may be measurements from one or more of the sensors themselves. In this use case, an engineer may want to detect when a combination of sensors is able to, within some level of fidelity, recreate the measurements from another sensor.

One existing solution measures simple correlations of individual sensors with the dependent variable of interest. This is easiest because the sensors can be tested one at a time, and it avoids the combinatorial problem of having to combine and test two or more sensors at once. But this solution misses important cases in which the dependent variable must be explained by multiple sensors simultaneously.

A multivariate approach might be to apply a machine learning technique such as a random forest to the data to use its feature importance capability. But training a random forest on all of the raw, multivariate sensor data is infeasible. The time series data needs to be reduced through feature extraction first before a machine learning model can be built and deployed. Feature extraction introduces at least two further problems. Simple feature extraction such as straight statistics of the raw time series may hide important temporal and/or interrelated behaviors present in the raw data. On the other hand, manually defining high-fidelity feature extractors is difficult and time-consuming for all the sensors and is a therefore essentially a reformulation of the original problem.

Therefore it would be desirable to have a system and method that takes into account at least some of the issues discussed above, as well as other possible issues.

BRIEF SUMMARY

Example implementations of the present disclosure are directed to selecting a subset of independent variables from a plurality of independent variables to predict a dependent variable. Example implementations applies genetic programming to a multivariate time series of independent variables. To this end, existing genetic programming libraries can be extended to enable their application to multivariate time series data, and a library of primitive functions can be used to allow arbitrary combinations of time series transformations in an evolving genetic programming tree.

Example implementations also leverages multiple runs of genetic programming. In traditional genetic programming optimization, a run of genetic programming is performed to find the best individual. In accordance with example implementations of the present disclosure, runs of genetic programming are iteratively performed to estimate the importance of sensors by an evaluation process that tracks sensor usage in conjunction with tree fitness throughout multiple independent runs of the genetic programming. Example implementations take into account issues with existing solutions by working directly with raw sensor data, and automatically generating, evaluating, and improving combinations of sensors. This avoids the potential loss of valuable information through arbitrary feature extraction, and allows the detection and characterization of more complex interactions between multiple sensors.

The present disclosure thus includes, without limitation, the following example implementations.

Some example implementations provide a method of selecting a subset of independent variables from a plurality of independent variables to predict a dependent variable, the method comprising accessing a multivariate time series including observations of data, each of the observations of data including or indicating values of the plurality of independent variables, and a value of the dependent variable. The method further comprises iteratively performing runs of genetic programming on groups of independent variables from the plurality of independent variables, including for an iteration of a plurality of iterations: randomly generating a population of computer programs from a group of independent variables selected from the plurality of independent variables, and primitive functions selected from a library of primitive functions, to predict the dependent variable; iteratively transforming the population of computer programs into new generations of the population of computer programs, and including sub-rankings of the group of independent variables based on a quantitative fitness of respective computer programs in the population of computer programs and the new generations of the population of computer programs to predict the dependent variable, the quantitative fitness being determined according to selected fitness criterion; and producing a ranking of the group of independent variables from the sub-rankings of the group of independent variables. The method further comprises producing an aggregate ranking of the plurality of independent variables from the ranking of the group of independent variables over the plurality of iterations and selecting the subset of independent variables from the aggregate ranking of the plurality of independent variables, and according to selected optimization criterion.

In some example implementations of the method of any preceding example implementation, or any combination of any preceding example implementations, iteratively transforming the population of computer programs includes for a first sub-iteration of a plurality of sub-iterations: executing the population of computer programs over values of the group of independent variables for each of the observations of data to produce predictions of the dependent variable; determining the quantitative fitness of the respective computer programs in the population of computer programs according to the selected fitness criterion, and based on the predictions and the value of the dependent variable; producing a first sub-ranking of the group of independent variables based on the quantitative fitness; and generating a first new generation of the population of computer programs for a second sub-iteration of the plurality of sub-iterations, from the population of computer programs, according to an evolutionary algorithm, and based on the quantitative fitness.

In some example implementations of the method of any preceding example implementation, or any combination of any preceding example implementations, iteratively transforming the population of computer programs includes for a sub-iteration of a plurality of sub-iterations: executing a new generation of the population of computer programs from a preceding sub-iteration of the plurality of sub-iterations, over values of the group of independent variables for each of the observations of data to produce predictions of the dependent variable; determining the quantitative fitness of the respective computer programs in the new generation of the population of computer programs according to the selected fitness criterion, and based on the predictions and the value of the dependent variable; producing a sub-ranking of the group of independent variables based on the quantitative fitness; and generating a next new generation of the population of computer programs for a next sub-iteration of the plurality of sub-iterations, from the new generation of the population of computer programs, according to an evolutionary algorithm, and based on the quantitative fitness.

In some example implementations of the method of any preceding example implementation, or any combination of any preceding example implementations, the selected fitness criterion includes accuracy, correlation or error rate of predictions of the dependent variable from the respective computer programs relative to values of the dependent variable from the observations of data.

In some example implementations of the method of any preceding example implementation, or any combination of any preceding example implementations, the plurality of independent variables are a plurality of environmental conditions measurable by a plurality of sensors, the values of the plurality of independent variables are measurements of the plurality of environmental conditions from the plurality of sensors, the aggregate ranking of the plurality of independent variables is an aggregate ranking of the plurality of sensors, and selecting the subset of independent variables includes selecting a subset of sensors from the plurality of sensors.

In some example implementations of the method of any preceding example implementation, or any combination of any preceding example implementations, the selected optimization criterion includes a number of sensors in the subset of sensors, or one or more quantitative properties that define sensors of the plurality of sensors.

In some example implementations of the method of any preceding example implementation, or any combination of any preceding example implementations, the one or more quantitative properties that define the sensors of the plurality of sensors include cost, weight, power consumption, reliability, maintainability, or complexity of installation.

In some example implementations of the method of any preceding example implementation, or any combination of any preceding example implementations, the observations of data are observations of flight data for a plurality of flights of an aircraft, for each flight of which the measurements of the plurality of environmental conditions are measurements recorded during the flight by an airborne flight recorder from the plurality of sensors onboard the aircraft.

In some example implementations of the method of any preceding example implementation, or any combination of any preceding example implementations, the value of the dependent variable is an indication of a condition of the aircraft or one or more parts of the aircraft, and the method further comprises at least selecting the subset of sensors as a set of features for use in building a machine learning model to predict the condition of the aircraft or one or more parts of the aircraft; building the machine learning model using a machine learning algorithm, the set of features, and a training set; and outputting the machine learning model for deployment to predict and thereby produce predictions of the condition of the aircraft or one or more parts of the aircraft for additional observations of the flight data that exclude the indication of the condition of the aircraft or one or more parts of the aircraft.

Some example implementations provide an apparatus for selecting a subset of independent variables from a plurality of independent variables to predict a dependent variable. The apparatus comprises a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for selecting a subset of independent variables from a plurality of independent variables to predict a dependent variable. The computer-readable storage medium is non-transitory and has computer-readable program code stored therein that in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
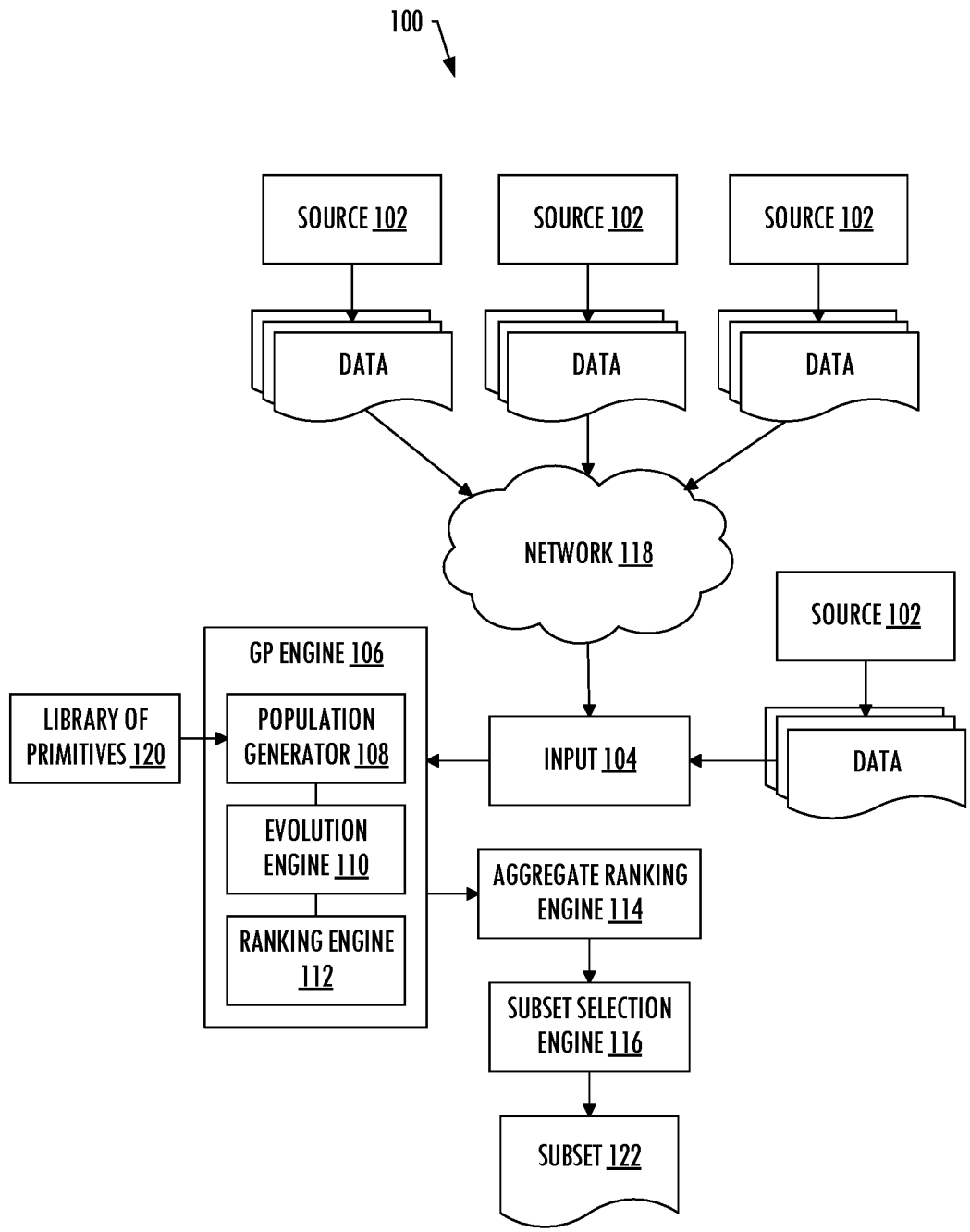
FIG. 1 illustrates a system for selecting a subset of independent variables from a plurality of independent variables to predict a dependent variable, according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are directed to selecting a subset of independent variables from a plurality of independent variables to predict a dependent variable. Example implementations will be primarily described in the context of automated feature generation for selection of a subset of sensors of an aircraft or other vehicle or manufactured system. It should be understood that example implementation may be applied in a number of contexts, some of which are described in greater detail below.

In at least examples involving sensor subset selection, example implementations assume a plurality of sensors generating multivariate time series data, a library of primitive functions, and selected optimization criteria. As explained in greater detail below, example implementations use genetic programming to evolve computer programs that apply combinations of primitive functions to subsets of sensor data (these computer programs at times are referred to as "feature extractors"). Example implementations track and aggregate the use and fitness of individual sensors over multiple independent runs of genetic programming to estimate the importance of each sensor. The list of sensors ranked by importance may then identify subsets that best meet the optimization criterion.

FIG. 1 illustrates a system 100 for selecting a subset of independent variables from a plurality of independent variables to predict a dependent variable, according to example implementations of the present disclosure. The system may include any of a number of different subsystems (each an individual system) for performing one or more functions or operations. As shown, in some examples, the system includes at least one source 102 of data, an input 104, and a genetic programming (GP) engine 106 with a population generator 108, an evolution engine 110 and a ranking engine 112. As also shown, the system includes an aggregate ranking engine 114 and a subset selection engine 116.

The subsystems including the source 102, input 104, GP engine 106, aggregate ranking engine 114 and a subset selection engine 116 may be co-located or directly coupled to one another, or in some examples, various ones of the subsystems may communicate with one another across one or more computer networks 118. Further, although shown as part of the system 100, it should be understood that any one or more of the above may function or operate as a separate system without regard to any of the other subsystems. It should also be understood that the system may include one or more additional or alternative subsystems than those shown in FIG. 1.

As described herein, a source 102 is a source of data. In some examples, the source 102 includes a memory that may be located at a single source or distributed across multiple sources. The memory may store data such as a multivariate time series including observations of data, with each of the observations of data including or indicating values of the plurality of independent variables, and a value of the dependent variable. These observations may be considered labeled time series data (values of the independent variables labeled with a value of the dependent variable). The data may be stored in a number of different manners, such as in a database or flat files of any of a number of different types or formats.

In some examples, the plurality of independent variables are a plurality of environmental conditions measurable by a plurality of sensors, and the values of the plurality of independent variables are measurements of the plurality of environmental conditions from the plurality of sensors. In some more particular examples, the observations of data are observations of flight data for plurality of flights of an aircraft. In these examples, for each flight of the plurality of flights, the measurements of the plurality of environmental conditions are measurements recorded during the flight by an airborne flight recorder from the plurality of sensors onboard the aircraft.

In some further examples, as indicated above and further explained below, the value of the dependent variable is an indication of a condition of the aircraft or one or more parts of the aircraft (e.g., pass-fail, healthy-faulty, failure type, etc.). In these examples, the subset of sensors is selected as a set of features for use in building a machine learning model to predict the condition of the aircraft or one or more parts of the aircraft. The machine learning model is built using a machine learning algorithm, the set of features, and a training set. And the machine learning model is output for deployment to predict and thereby produce predictions of the condition of the aircraft or one or more parts of the aircraft for additional observations of the flight data that exclude the indication of the condition of the aircraft or one or more parts of the aircraft.

A prediction of the condition of the aircraft or part(s) of the aircraft may indicate an impending fault or failure, and cause an alert to maintenance personnel. In response to the alert, maintenance personnel may perform maintenance on the aircraft consistent with the prediction. This may include maintenance personnel replacing or repairing one or more parts of the aircraft at the root cause of or otherwise implicated in the impending fault or failure.

According to example implementations, the input 104 is configured to access the multivariate time series (including the observations of data) from one or more sources 102. The GP engine 106 is configured to iteratively perform runs of genetic programming on groups of independent variables from the plurality of independent variables. For an iteration of a plurality of iterations, this includes the population generator 108, evolution engine 110 and ranking engine 112.

The population generator 108 is configured to randomly (randomly or pseudorandomly) generate a population of computer programs from a group of independent variables selected from the plurality of independent variables, and primitive functions selected from a library of primitive functions 120, to predict the dependent variable. Each computer program may include one or more independent variables and one or more primitive functions. As described herein, a primitive function is a relationship or expression that maps input data to output data. Examples of suitable primitive functions include mathematical operations such as addition, subtraction, multiplication, division, sine, cosine, tangent, log, exponential and the like. Other examples include minimum, maximum, average, standard deviation, kurtosis, skewness, variance, quantile and the like. Yet other examples, including normalize, lag, filter, moving window average, threshold, decay, equal, time difference, and the like.

The evolution engine 110 is configured to iteratively transform the population of computer programs into new generations of the population of computer programs. This includes sub-rankings of the group of independent variables based on a quantitative fitness of respective computer programs in the population of computer programs and the new generations of the population of computer programs to predict the dependent variable, with the quantitative fitness being determined according to selected fitness criterion. Examples of suitable fitness criterion include accuracy, correlation or error rate of predictions of the dependent variable from the respective computer programs relative to values of the dependent variable from the observations of data, and the like. The ranking engine 112 is then configured to produce a ranking of the group of independent variables from the sub-rankings of the group of independent variables.

For a first sub-iteration of a plurality of sub-iterations, in some examples, the evolution engine 110 is configured to execute the population of computer programs over values of the group of independent variables for each of the observations of data to produce predictions of the dependent variable. In these examples, the evolution engine is also configured to determine the quantitative fitness of the respective computer programs in the population of computer programs according to the selected fitness criterion, and based on the predictions and the value of the dependent variable. The evolution engine is configured to produce a first sub-ranking of the group of independent variables based on the quantitative fitness. And the evolution engine is configured to generate a first new generation of the population of computer programs for a second sub-iteration of the plurality of sub-iterations, from the population of computer programs, according to an evolutionary algorithm, and based on the quantitative fitness.

For a sub-iteration of a plurality of sub-iterations, and in particular a sub-iteration after the first sub-iteration, in some examples, the evolution engine 110 is configured to execute a new generation of the population of computer programs from a preceding sub-iteration of the plurality of sub-iterations, over values of the group of independent variables for each of the observations of data to produce predictions of the dependent variable. In these examples, the evolution engine is configured to determine the quantitative fitness of the respective computer programs in the new generation of the population of computer programs according to the selected fitness criterion, and based on the predictions and the value of the dependent variable. The evolution engine is configured to produce a sub-ranking of the group of independent variables based on the quantitative fitness. And the evolution engine is configured to generate a next new generation of the population of computer programs for a next sub-iteration of the plurality of sub-iterations, from the new generation of the population of computer programs, according to an evolutionary algorithm, and based on the quantitative fitness.

The aggregate ranking engine 114 is configured to produce an aggregate ranking of the plurality of independent variables from the ranking of the group of independent variables over the plurality of iterations. The subset selection engine 116 is configured to select the subset of independent variables 122 from the aggregate ranking of the plurality of independent variables, and according to selected optimization criterion. Examples of suitable optimization criteria include correlation, accuracy, $F_1$ score (also referred to as F-score or F-measure), mean-square error (MSE), p-value (also referred to as probability value or asymptotic significance) and the like.

In some examples in which the plurality of independent variables are a plurality of environmental conditions as introduced above, the aggregate ranking of the plurality of independent variables includes an aggregate ranking of the plurality of sensors. In these examples, the subset selection engine 116 being configured to select the subset of independent variables 122 includes the subset selection engine being configured to a subset of sensors from the plurality of sensors. In some examples, the selected optimization criterion includes a number of sensors in the subset of sensors, or one or more quantitative properties that define sensors of the plurality of sensors. And in some further examples, the one or more quantitative properties that define the sensors of the plurality of sensors include cost, weight, power consumption, reliability, maintainability, or complexity of installation.

Figure 2:
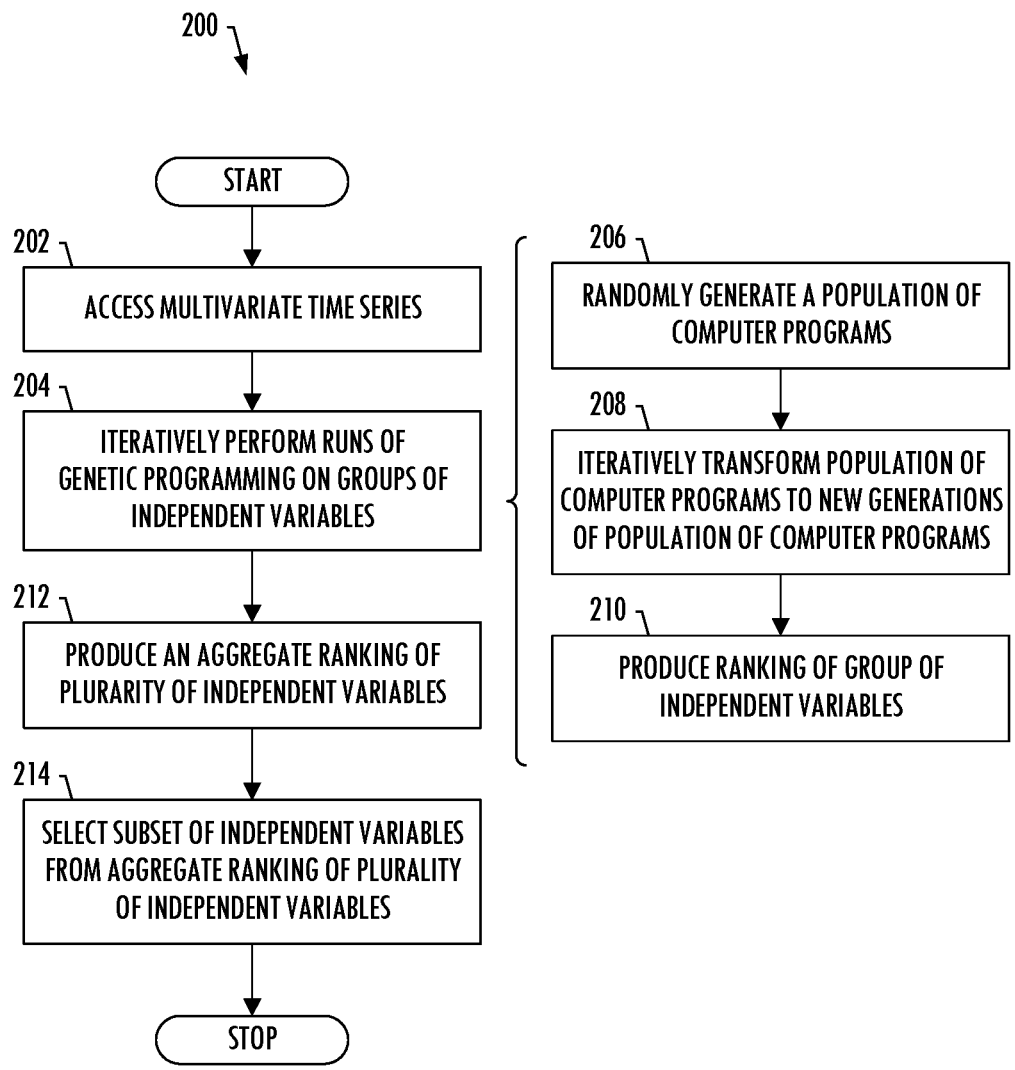
FIG. 2 is a flowchart illustrating various steps in a method of selecting a subset of independent variables from a plurality of independent variables to predict a dependent variable, according to example implementations.

FIG. 2 is a flowchart illustrating various steps in a method 200 of selecting a subset of independent variables from a plurality of independent variables to predict a dependent variable, according to example implementations of the present disclosure. As shown at block 202, the method includes accessing a multivariate time series including observations of data, each of the observations of data including or indicating values of the plurality of independent variables, and a value of the dependent variable. As shown at block 204, the method includes iteratively performing runs of genetic programming on groups of independent variables from the plurality of independent variables.

For an iteration of a plurality of iterations, performing the runs of genetic programming includes randomly generating a population of computer programs from a group of independent variables selected from the plurality of independent variables, and primitive functions selected from a library of primitive functions, to predict the dependent variable, as shown at block 206. The method includes iteratively transforming the population of computer programs into new generations of the population of computer programs, and including sub-rankings of the group of independent variables based on a quantitative fitness of respective computer programs in the population of computer programs and the new generations of the population of computer programs to predict the dependent variable, with the quantitative fitness being determined according to selected fitness criterion, as shown at block 208. And the method includes producing a ranking of the group of independent variables from the sub-rankings of the group of independent variables, as shown at block 210.

As shown at block 212, the method includes producing an aggregate ranking of the plurality of independent variables from the ranking of the group of independent variables over the plurality of iterations. And as shown at block 214, the method includes selecting the subset of independent variables from the aggregate ranking of the plurality of independent variables, and according to selected optimization criterion.

Figure 3:
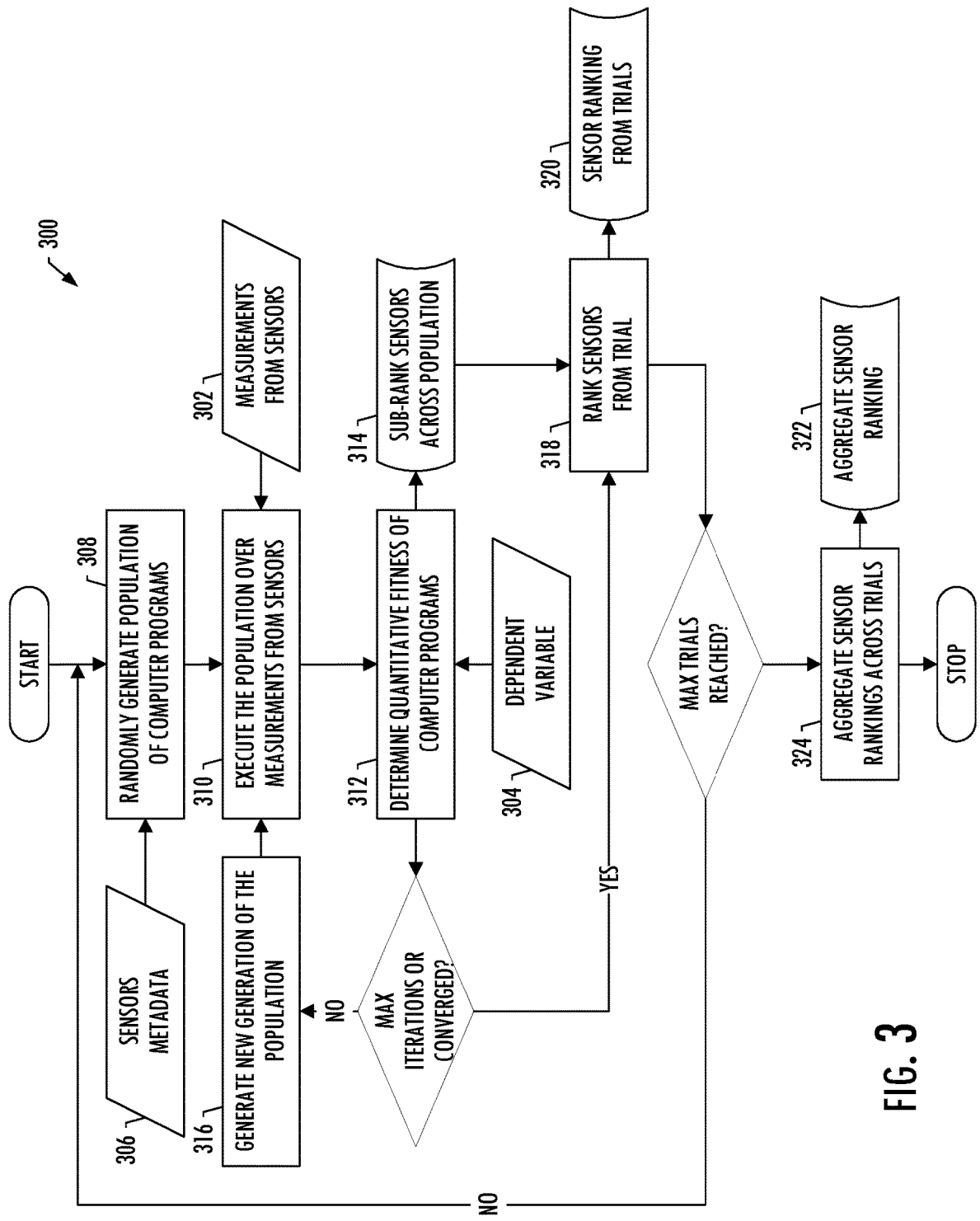
FIG. 3 is a flowchart illustrating in greater detail various steps in a method of selecting a subset of independent variables from a plurality of independent variables to predict a dependent variable, according to example implementations.

FIG. 3 is a flowchart illustrating in greater detail various steps in a method 300 of selecting a subset of sensors from a plurality of sensors to predict a dependent variable, according to example implementations. The method includes accessing a multivariate time series including observations of flight data for a plurality of flights of an aircraft. For each flight, the observations of data include or indicate measurements 302 of a plurality of environmental conditions measurable by the plurality of sensors, and a value of the dependent variable 304. In some examples, the sensors may produce associated metadata 306 (structured data that provides information about the measurements), and this metadata may indicate the plurality of sensors and/or the environmental conditions measured by the plurality of sensors.

The method includes iteratively performing runs of genetic programming on groups of sensors from the plurality of sensors, as shown at blocks 308-318. For an iteration of a plurality of iterations, this includes randomly generating a population of computer programs from a group of sensors selected from the plurality of sensors, and primitive functions selected from a library of primitive functions, to predict the dependent variable, as shown at block 308. The method includes iteratively transforming the population of computer programs into new generations of the population of computer programs, as shown at blocks 310-316.

As shown at block 310, the population of computer programs is executed over measurements 302 of the group of sensors for each of the observations to produce predictions of the dependent variable 304. The quantitative fitness of the respective computer programs in the population of computer programs according to selected fitness criterion, and based on the predictions and the value of the dependent variable, as shown at block 312. A sub-ranking of the group of sensors is produced based on the quantitative fitness, as shown at block 314. And a next new generation of the population of computer programs is generated for a next sub-iteration of the plurality of sub-iterations, from the new generation of the population of computer programs, according to an evolutionary algorithm, and based on the quantitative fitness, as shown at block 316. This may then repeat until reaching a maximum number of sub-iterations or until the quantitative fitness of the new generation converges.

As shown at block 318, the iteration of genetic programming also includes producing a ranking 320 of the group of sensors from the sub-rankings of the group of sensors. This iterative run of genetic programming can repeat for a plurality of trials until reaching a maximum number, with each iteration initially differing in the randomly generated population of computer programs (block 308), including the selected group of sensors and primitive functions. The method then includes producing an aggregate ranking 322 of the plurality of sensors from the ranking of the group of sensors over the plurality of iterations, as shown at block 324. And the method includes selecting the subset of sensors from the aggregate ranking of the plurality of sensors, and according to selected optimization criterion.

As indicated above, the selection or generation of relevant features—here the subset of independent variables—is often an integral part of machine learning. Example implementations may therefore be useful in the development of a machine learning model. In this regard, development of a machine learning model may include selecting the subset of independent variables as a set of features for use in building the machine learning model to predict the dependent variable (e.g., condition of an aircraft). The machine learning model may then be built using a machine learning algorithm, the set of features, and an appropriate training set that may in some examples come from the observations of data from which the subset of independent variables is selected. This machine learning model may then be output for deployment to predict and thereby produce predictions of the dependent variable for additional observations of the data that exclude the value of the dependent variable.

As indicated above, example implementations of the present disclosure may be applied in a number of contexts, including automated feature generation for selection of a subset of sensors of an aircraft or other vehicle or manufactured system. Three additional example contexts described below include (1) human-interpretable event characterization, (2) feature extractor optimization, and (3) prediction accuracy optimization.

For human-interpretable event characterization, example implementations may be used to find behaviors in the data that characterize events of interest. For example, "for 9 out of 10 failures, the actual position of valve X is lagging the commanded position by greater than Z seconds." Here, the optimization criterion includes the number of failure cases characterized (e.g., 9 out of 10), including a penalty on the number of non-failure cases also characterized as failure cases (i.e., false positives). The sensors in this example include valve X's actual position and commanded position, and the primitive functions may include "lag" and "greater than" operators. In this context, one may look to examine the best-performing computer program(s) generated by the GP engine 106.

For feature extractor optimization, example implementations may be used to automatically refine an existing, manually-produced feature extractor (computer program). For example, the manually-produced feature extractor may be defined as "the number of distinct times at which the actual position of valve X is lagging the commanded position of valve X by greater than 2.5 seconds." In this context, the optimization criterion includes what motivated production of the manually-produced feature extractor (e.g., detect as many failures as possible). Similarly, the sensors may include at least those sensors used in producing the manually-produced feature extractor as well as, in this example, a sensor indicating the phase of flight.

The primitive functions may include at least the manually-produced feature extractor itself but also, in this example, a "filter" operator. The context here may optimize the manually-produced feature extractor into something like, "the number of distinct times at which the actual position of valve X is lagging the commanded position of valve X by greater than 1.7 seconds but only when the aircraft is in the climb or descent phase of flight." In this example, example implementations have optimized the manually-produced feature by finding a better threshold (1.7, as found in the data) combined with finding when this behavior is most important (climb and descent). In this example context, one may look to optimize an existing feature extractor (computer program), which may include keeping the optimized feature extractor or perhaps identifying a subset of sensors that are relevant to further manually optimizing this manually-produced feature.

For prediction accuracy optimization, example implementations may be used to find a set of one or more feature extractors that, when given to a machine learning algorithm, predict some outcome of interest, such as an impending component failure. This is briefly described above, although in this context, one may do more than just use the identified subset of sensors as features, and may also use the actual high-performing computer programs acting on the sensor data as features.

There are many advantages of example implementations of the present disclosure, both in the context of classifying the condition of an aircraft and in other contexts. In some examples, a machine learning model developed according to example implementations of the present disclosure is deployed in aircraft health management software as an aircraft condition monitoring system report. Flight delays and cancellations are extremely disruptive and costly for airlines. Deployment and use of machine learning model of example implementations may trim minutes from delays or avoid cancellations by recognizing and alerting to early signs of impending failures, and may thereby significantly contribute to an airline's bottom line. The machine learning model may help to predict faults in advance and provide alerts to avoid unscheduled maintenance.

Example implementations may be further used in design and manufacture of aircraft or other vehicle or manufactured system (generally a manufactured system). Example implementations may inform the design and thereby manufacture in the selected fitness criterion. For example, if example implementations find that n–m sensors adequately perform the same function as that of an original set of n sensors, then cost/weight/complexity of installation/etc. can be optimized in the design of the manufactured system. Or as a slight variation, example implementations can find that a set of sensors A can perform the same function as a set of sensors B (even if |A|>|B|), such that reliability/maintainability/etc. is optimized.

Example implementations may inform the design and thereby manufacture in the design of a component itself (and thereby subsequent manufacture of the component). This is related to the above-describe human-interpretable event characterization. Suppose that human-interpretable event characterization finds a large portion of the failure modes, such that actual in-service behavior deviates from the expectations in the appropriate failure modes and effects analysis (FMEA). Example implementations may inform an engineer to re-design a component such that it matches realities in the field. For example, "this valve has been re-designed to make it more robust to altitude changes (climb and descent) and therefore more reliable with respect to this specific failure mode, which has occurred more often than previously anticipated." Without knowing the conditions and behaviors that characterized failures in the field, the engineer has less direction for coming up with a re-design that has the highest chance of increasing the reliability of the component.

According to example implementations of the present disclosure, the system 100 and its subsystems including the source 102, input 104, GP engine 106, aggregate ranking engine 114 and a subset selection engine 116 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 4:
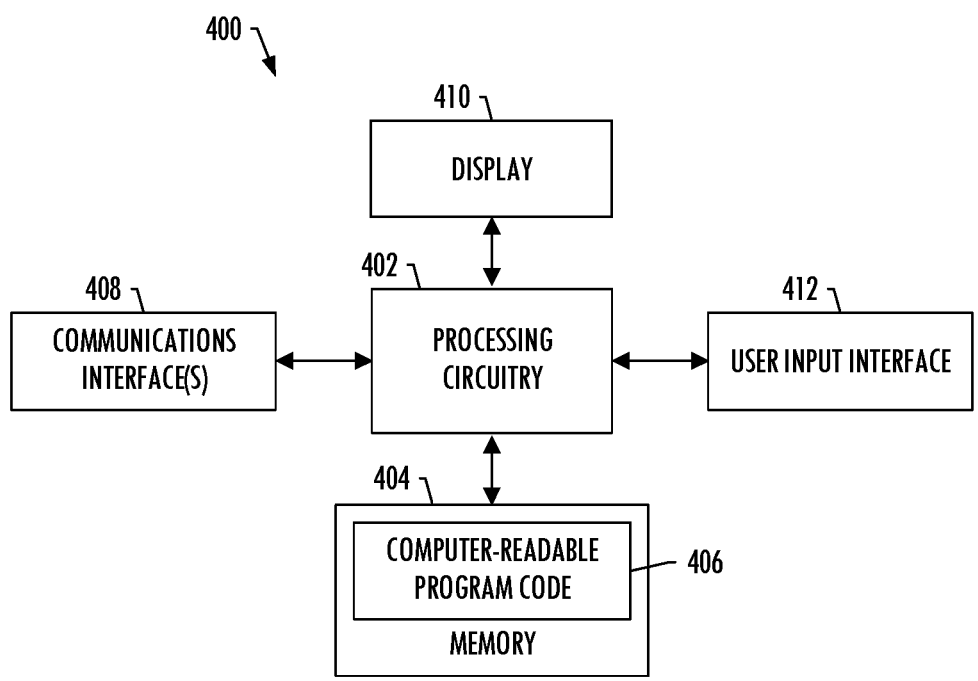
FIG. 4 illustrates an apparatus according to some example implementations.

FIG. 4 illustrates an apparatus 400 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 402 (e.g., processor unit) connected to a memory 404 (e.g., storage device).

The processing circuitry 402 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 404 (of the same or another apparatus).

The processing circuitry 402 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 404 is generally any piece of computer hardware that is capable of storing information such as, for example, data, computer programs (e.g., computer-readable program code 406) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 404, the processing circuitry 402 may also be connected to one or more interfaces for displaying, transmitting and/or receiving information. The interfaces may include a communications interface 408 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 410 and/or one or more user input interfaces 412 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 400 may include a processing circuitry 402 and a computer-readable storage medium or memory 404 coupled to the processing circuitry, where the processing circuitry is configured to execute computer-readable program code 406 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for selecting a subset of independent variables from a plurality of independent variables to predict a dependent variable, the apparatus comprising:
a memory configured to store computer-readable program code; and
processing circuitry configured to access the memory, and execute the computer-readable program code to cause the apparatus to at least:
access a multivariate time series including observations of data being observations of flight data for a plurality of flights of an aircraft, and each of the observations of data including or indicating values of the plurality of independent variables being a plurality of environmental conditions that are measurable by a plurality of sensors that provide raw sensor data, and a value of the dependent variable being an indication of a parameter of the aircraft;
iteratively perform runs of genetic programming on groups of independent variables from the plurality of independent variables based on the raw sensor data from the sensors, wherein the runs of the genetic programming are iteratively performed to estimate an importance of the sensors by an evaluation process that tracks sensor usage in conjunction with tree fitness throughout multiple independent runs of the genetic programming, including for an iteration of a plurality of iterations;
randomly generate a population of computer programs from a group of independent variables selected from the plurality of independent variables based on the raw sensor data from the sensors, and primitive functions selected from a library of primitive functions, to predict the dependent variable being the indication of the parameter of the aircraft, wherein the primitive functions include one or more manually-produced feature extractors and a filter operator configured to optimize the one or more manually-produced feature extractors;
iteratively transform the population of computer programs into new generations of the population of computer programs, and including sub-rankings of the group of independent variables based on a quantitative fitness of respective computer programs in the population of computer programs and the new generations of the population of computer programs to predict the dependent variable being the indication of the parameter of the aircraft, the quantitative fitness being determined according to a selected fitness criterion;
produce a ranking of the group of independent variables from the sub-rankings of the group of independent variables based on the raw sensor data from the sensors;
produce an aggregate ranking of the plurality of independent variables from the ranking of the group of independent variables over the plurality of iterations; and
select the subset of independent variables from the aggregate ranking of the plurality of independent variables, and according to a selected optimization criterion,
wherein the values of the plurality of independent variables are measurements of the plurality of environmental conditions from the plurality of sensors,
wherein the aggregate ranking of the plurality of independent variables is an aggregate ranking of the plurality of sensors based on the raw sensor data, and the apparatus being caused to select the subset of independent variables includes being caused to select a subset of sensors from the plurality of sensors being ranked by importance and relevant to a dependent variable of interest; and
wherein the optimization criterion includes human-interpretable event characterization configured to find behaviors in the raw sensor data that characterize events of interest, feature extractor optimization configured to automatically refine an existing one of the manually-produced feature extractors, and prediction accuracy optimization configured to find a set of one or more of the manually-produced feature extractors which given to a machine learning algorithm, predicts an outcome of interest.

2. The apparatus of claim 1, wherein the apparatus being caused to iteratively transform the population of computer programs includes, for a first sub-iteration of a plurality of sub-iterations, the apparatus being caused to:
execute the population of computer programs over values of the group of independent variables for each of the observations of data to produce predictions of the dependent variable;
determine the quantitative fitness of the respective computer programs in the population of computer programs according to the selected fitness criterion, and based on the predictions and the value of the dependent variable;
produce a first sub-ranking of the group of independent variables based on the quantitative fitness; and
generate a first new generation of the population of computer programs for a second sub-iteration of the plurality of sub-iterations, from the population of computer programs, according to an evolutionary algorithm, and based on the quantitative fitness.

3. The apparatus of claim 1, wherein the apparatus being caused to iteratively transform the population of computer programs includes, for a sub-iteration of a plurality of sub-iterations, the apparatus being caused to:
execute a new generation of the population of computer programs from a preceding sub-iteration of the plurality of sub-iterations, over values of the group of independent variables for each of the observations of data to produce predictions of the dependent variable;
determine the quantitative fitness of the respective computer programs in the new generation of the population of computer programs according to the selected fitness criterion, and based on the predictions and the value of the dependent variable; and
produce a sub-ranking of the group of independent variables based on the quantitative fitness.

4. The apparatus of claim 1, wherein the selected fitness criterion includes accuracy, correlation or error rate of predictions of the dependent variable from the respective computer programs relative to values of the dependent variable from the observations of data.

5. The apparatus of claim 1, wherein the selected optimization criterion includes a number of sensors in the subset of sensors, or one or more quantitative properties that define sensors of the plurality of sensors.

6. The apparatus of claim 5, wherein the one or more quantitative properties that define the sensors of the plurality of sensors include cost, weight, power consumption, reliability, maintainability, or complexity of installation.

7. The apparatus of claim 1, wherein the observations of data are the observations of flight data for the plurality of flights of the aircraft, for each of the flights of which the measurements of the plurality of environmental conditions are measurements recorded during the flight by an airborne flight recorder from the plurality of sensors onboard the aircraft.

8. The apparatus of claim 7, wherein the value of the dependent variable is the indication of at least one parameter of the aircraft and further includes an indication of a condition of the aircraft or one or more parts of the aircraft, and the processing circuitry is configured to execute the computer-readable program code to cause the apparatus to further at least:
  select the subset of sensors as a set of features for use in building a machine learning model to predict the condition of the aircraft or one or more parts of the aircraft;
  build the machine learning model using the machine learning algorithm, the set of features, and a training set; and
  output the machine learning model for deployment to predict and thereby produce predictions of the condition of the aircraft or one or more parts of the aircraft for additional observations of the flight data that exclude the indication of the condition of the aircraft or one or more parts of the aircraft.

9. The apparatus of claim 3, wherein the apparatus is further caused to generate a next new generation of the population of computer programs for a next sub-iteration of the plurality of sub-iterations, from the new generations of the population of computer programs, according to an evolutionary algorithm, and based on the quantitative fitness.

10. A method of selecting a subset of independent variables from a plurality of independent variables to predict a dependent variable, the method comprising:
  accessing a multivariate time series including observations of data being observations of flight data for a plurality of flights of an aircraft, and each of the observations of data including or indicating values of the plurality of independent variables being a plurality of environmental conditions that are measurable by a plurality of sensors that provide raw sensor data, and a value of the dependent variable being an indication of a parameter of the aircraft;
  iteratively performing runs of genetic programming on groups of independent variables from the plurality of independent variables based on the raw sensor data from the sensors, wherein the runs of the genetic programming are iteratively performed to estimate an importance of the sensors by an evaluation process that tracks sensor usage in conjunction with tree fitness throughout multiple independent runs of the genetic programming, including for an iteration of a plurality of iterations:
  randomly generating a population of computer programs from a group of independent variables selected from the plurality of independent variables based on the raw sensor data from the sensors, and primitive functions selected from a library of primitive functions, to predict the dependent variable being the indication of the parameter of the aircraft, wherein the primitive functions include one or more manually-produced feature extractors and a filter operator configured to optimize the one or more manually-produced feature extractors;
  iteratively transforming the population of computer programs into new generations of the population of computer programs, and including sub-rankings of the group of independent variables based on a quantitative fitness of respective computer programs in the population of computer programs and the new generations of the population of computer programs to predict the dependent variable being the indication of the parameter of the aircraft, the quantitative fitness being determined according to a selected fitness criterion;
  producing a ranking of the group of independent variables from the sub-rankings of the group of independent variables based on the raw sensor data from the sensors;
  producing an aggregate ranking of the plurality of independent variables from the ranking of the group of independent variables over the plurality of iterations; and
  selecting the subset of independent variables from the aggregate ranking of the plurality of independent variables, and according to a selected optimization criterion,
  wherein the values of the plurality of independent variables are measurements of the plurality of environmental conditions from the plurality of sensors,
  wherein the aggregate ranking of the plurality of independent variables is an aggregate ranking of the plurality of sensors based on the raw sensor data, and selecting the subset of independent variables includes selecting a subset of sensors from the plurality of sensors being ranked by importance and relevant to a dependent variable of interest; and
  wherein the optimization criterion includes human-interpretable event characterization configured to find behaviors in the raw sensor data that characterize events of interest, feature extractor optimization configured to automatically refine an existing one of the manually-produced feature extractors, and prediction accuracy optimization configured to find a set of one or more of the manually-produced feature extractors which given to a machine learning algorithm, predicts an outcome of interest.

11. The method of claim 10, wherein iteratively transforming the population of computer programs includes, for a first sub-iteration of a plurality of sub-iterations:
  executing the population of computer programs over values of the group of independent variables for each of the observations of data to produce predictions of the dependent variable;
  determining the quantitative fitness of the respective computer programs in the population of computer programs according to the selected fitness criterion, and based on the predictions and the value of the dependent variable;
  producing a first sub-ranking of the group of independent variables based on the quantitative fitness; and
  generating a first new generation of the population of computer programs for a second sub-iteration of the plurality of sub-iterations, from the population of computer programs, according to an evolutionary algorithm, and based on the quantitative fitness.

12. The method of claim 10, wherein iteratively transforming the population of computer programs includes, for a sub-iteration of a plurality of sub-iterations:
  executing a new generation of the population of computer programs from a preceding sub-iteration of the plurality of sub-iterations, over values of the group of independent variables for each of the observations of data to produce predictions of the dependent variable;
  determining the quantitative fitness of the respective computer programs in the new generation of the population of computer programs according to the selected fitness criterion, and based on the predictions and the value of the dependent variable; and producing a sub-ranking of the group of independent variables based on the quantitative fitness.

13. The method of claim 10, wherein the selected fitness criterion includes accuracy, correlation or error rate of predictions of the dependent variable from the respective computer programs relative to values of the dependent variable from the observations of data.

14. The method of claim 10, wherein the selected optimization criterion includes a number of sensors in the subset of sensors, or one or more quantitative properties that define sensors of the plurality of sensors.

15. The method of claim 14, wherein the one or more quantitative properties that define the sensors of the plurality of sensors include cost, weight, power consumption, reliability, maintainability, or complexity of installation.

16. The method of claim 10, wherein the observations of data are the observations of flight data for the plurality of flights of the aircraft, for each of the flights of which the measurements of the plurality of environmental conditions are measurements recorded during the flight by an airborne flight recorder from the plurality of sensors onboard the aircraft.

17. The method of claim 16, wherein the value of the dependent variable is the indication of at least one parameter of the aircraft and further includes an indication of a condition of the aircraft or one or more parts of the aircraft, and the method further comprises at least:
selecting the subset of sensors as a set of features for use in building a machine learning model to predict the condition of the aircraft or one or more parts of the aircraft;
building the machine learning model using the machine learning algorithm, the set of features, and a training set; and
outputting the machine learning model for deployment to predict and thereby produce predictions of the condition of the aircraft or one or more parts of the aircraft for additional observations of the flight data that exclude the indication of the condition of the aircraft or one or more parts of the aircraft.

18. The method of claim 12, further comprising generating a next new generation of the population of computer programs for a next sub-iteration of the plurality of sub-iterations, from the new generation of the population of computer programs, according to an evolutionary algorithm, and based on the quantitative fitness.

19. A computer-readable storage medium for selecting a subset of independent variables from a plurality of independent variables being a plurality of environmental conditions that are measurable by a plurality of sensors that provide raw sensor data, to predict a dependent variable being an indication of a parameter of an aircraft, the computer-readable storage medium being non-transitory and having computer-readable program code stored therein that in response to execution by processing circuitry, causes an apparatus to at least:
access a multivariate time series including observations of data being observations of flight data for a plurality of flights of the aircraft, and each of the observations of data including or indicating values of the plurality of independent variables based on the raw sensor data from the sensors, and a value of the dependent variable being the indication of the parameter of the aircraft;
iteratively perform runs of genetic programming on groups of independent variables from the plurality of independent variables based on the raw sensor data from the sensors, wherein the runs of the genetic programming are iteratively performed to estimate an importance of the sensors by an evaluation process that tracks sensor usage in conjunction with tree fitness throughout multiple independent runs of the genetic programming, including for an iteration of a plurality of iterations:
randomly generate a population of computer programs from a group of independent variables selected from the plurality of independent variables based on the raw sensor data from the sensors, and primitive functions selected from a library of primitive functions, to predict the dependent variable being the indication of the parameter of the aircraft, wherein the primitive functions include one or more manually-produced feature extractors and a filter operator configured to optimize the one or more manually-produced feature extractors;
iteratively transform the population of computer programs into new generations of the population of computer programs, and including sub-rankings of the group of independent variables based on a quantitative fitness of respective computer programs in the population of computer programs and the new generations of the population of computer programs to predict the dependent variable being the indication of the parameter of the aircraft, the quantitative fitness being determined according to a selected fitness criterion;
produce a ranking of the group of independent variables from the sub-rankings of the group of independent variables based on the raw sensor data from the sensors;
produce an aggregate ranking of the plurality of independent variables from the ranking of the group of independent variables over the plurality of iterations; and
select the subset of independent variables from the aggregate ranking of the plurality of independent variables based on the raw sensor data from the sensors, and according to a selected optimization criterion,
wherein the values of the plurality of independent variables are measurements of the plurality of environmental conditions from the plurality of sensors,
wherein the aggregate ranking of the plurality of independent variables is an aggregate ranking of the plurality of sensors based on the raw sensor data, and the apparatus being caused to select the subset of independent variables includes being caused to select a subset of sensors from the plurality of sensors being ranked by importance and relevant to a dependent variable of interest; and
wherein the optimization criterion includes human-interpretable event characterization configured to find behaviors in the raw sensor data that characterize events of interest, feature extractor optimization configured to automatically refine an existing one of the manually-produced feature extractors, and prediction accuracy optimization configured to find a set of one or more of the manually-produced feature extractors which given to a machine learning algorithm, predicts an outcome of interest.

20. The computer-readable storage medium of claim 19, wherein the apparatus being caused to iteratively transform the population of computer programs includes, for a first sub-iteration of a plurality of sub-iterations, the apparatus being caused to:
execute the population of computer programs over values of the group of independent variables for each of the observations of data to produce predictions of the dependent variable;

determine the quantitative fitness of the respective computer programs in the population of computer programs according to the selected fitness criterion, and based on the predictions and the value of the dependent variable;

produce a first sub-ranking of the group of independent variables based on the quantitative fitness; and generate a first new generation of the population of computer programs for a second sub-iteration of the plurality of sub-iterations, from the population of computer programs, according to an evolutionary algorithm, and based on the quantitative fitness.

21. The computer-readable storage medium of claim 19, wherein the apparatus being caused to iteratively transform the population of computer programs includes, for a sub-iteration of a plurality of sub-iterations, the apparatus being caused to:

execute a new generation of the population of computer programs from a preceding sub-iteration of the plurality of sub-iterations, over values of the group of independent variables for each of the observations of data to produce predictions of the dependent variable;

determine the quantitative fitness of the respective computer programs in the new generation of the population of computer programs according to the selected fitness criterion, and based on the predictions and the value of the dependent variable; and produce a sub-ranking of the group of independent variables based on the quantitative fitness.

22. The computer-readable storage medium of claim 19, wherein the selected fitness criterion includes accuracy, correlation or error rate of predictions of the dependent variable from the respective computer programs relative to values of the dependent variable from the observations of data.

23. The computer-readable storage medium of claim 19, wherein the selected optimization criterion includes a number of sensors in the subset of sensors, or one or more quantitative properties that define sensors of the plurality of sensors.

24. The computer-readable storage medium of claim 23, wherein the one or more quantitative properties that define the sensors of the plurality of sensors include cost, weight, power consumption, reliability, maintainability, or complexity of installation.

25. The computer-readable storage medium of claim 19, wherein the observations of data are the observations of flight data for the plurality of flights of the aircraft, for each of the flights of which the measurements of the plurality of environmental conditions are measurements recorded during the flight by an airborne flight recorder from the plurality of sensors onboard the aircraft.

26. The computer-readable storage medium of claim 25, wherein the value of the dependent variable is the indication of at least one parameter of the aircraft and further includes an indication of a condition of the aircraft or one or more parts of the aircraft, and the computer-readable storage medium having the computer-readable program code stored therein that in response to execution by the processing circuitry, causes the apparatus to further at least:

select the subset of sensors as a set of features for use in building a machine learning model to predict the condition of the aircraft or one or more parts of the aircraft;

build the machine learning model using the machine learning algorithm, the set of features, and a training set; and output the machine learning model for deployment to predict and thereby produce predictions of the condition of the aircraft or one or more parts of the aircraft for additional observations of the flight data that exclude the indication of the condition of the aircraft or one or more parts of the aircraft.

27. The computer-readable storage medium of claim 21, wherein the apparatus is further caused to generate a next new generation of the population of computer programs for a next sub-iteration of the plurality of sub-iterations, from the new generation of the population of computer programs, according to an evolutionary algorithm, and based on the quantitative fitness.

* * * * *